M. LEITCH.
FEED FOR LIQUID TREATING DEVICES.
APPLICATION FILED JAN. 14, 1916.

1,195,596.

Patented Aug. 22, 1916.

WITNESS:
Rob. H. Ketchel.

INVENTOR
Meredith Leitch
BY Frank L. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

FEED FOR LIQUID-TREATING DEVICES.

1,195,596.  Specification of Letters Patent.  Patented Aug. 22, 1916.

Application filed January 14, 1916. Serial No. 72,012.

*To all whom it may concern:*

Be it known that I, MEREDITH LEITCH, a citizen of the United States, residing at Poughkeepsie, county of Dutchess, and State of New York, have invented a new and useful Improvement in Feeds for Liquid-Treating Devices, of which the following is a full, clear, and exact description, reference being had to the accompanying drawings, which form a part of this specification.

In order that centrifugal cream separator and other liquid treating machines may do good work it is necesary that a proper speed be reached before the feed of milk begins and that this speed be maintained during the time that milk is fed to the machine. It is a well known fact that through a limited range below normal speed efficient separation may be done if the feed is reduced with the reduction in speed and that for a limited range above normal speed the cream will not be too thick if the feed is increased with the speed. It is known in the art to provide means whereby the feed to the machine will increase with the speed, but this construction is open to the serious objection that the feed will commence at a very low speed and will continue during speeds below the minimum speed for good separation. The result is that an indefinite quantity of milk may be fed through the machine without separation.

The object of my invention is to provide means to cause the feed to the machine to start only after the machine attains an efficient separating speed and to increase the feed from substantially zero at the minimum speed for good separation to normal at normal speeds and greater than normal at higher speeds.

The invention will be understood by reference to the accompanying drawings, which show preferred embodiments of my invention, and in which—

Figure 1:
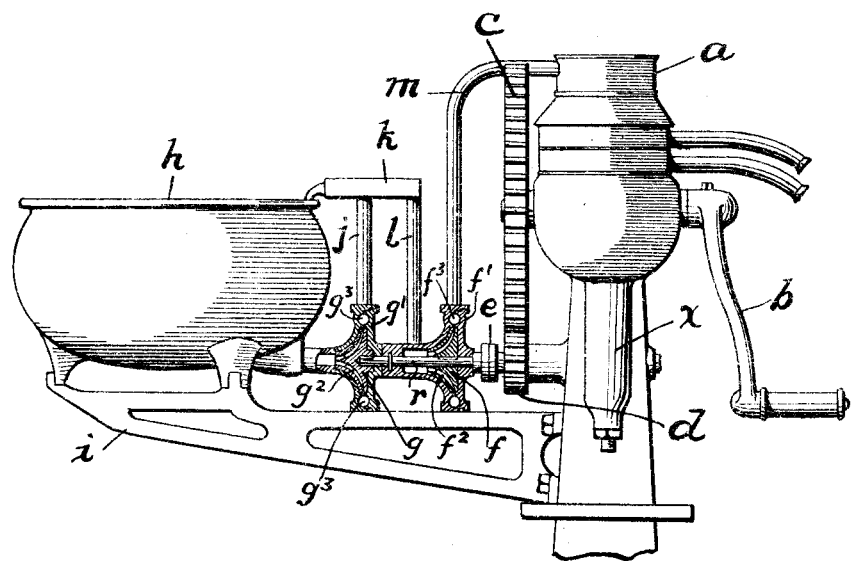
Figure 2:
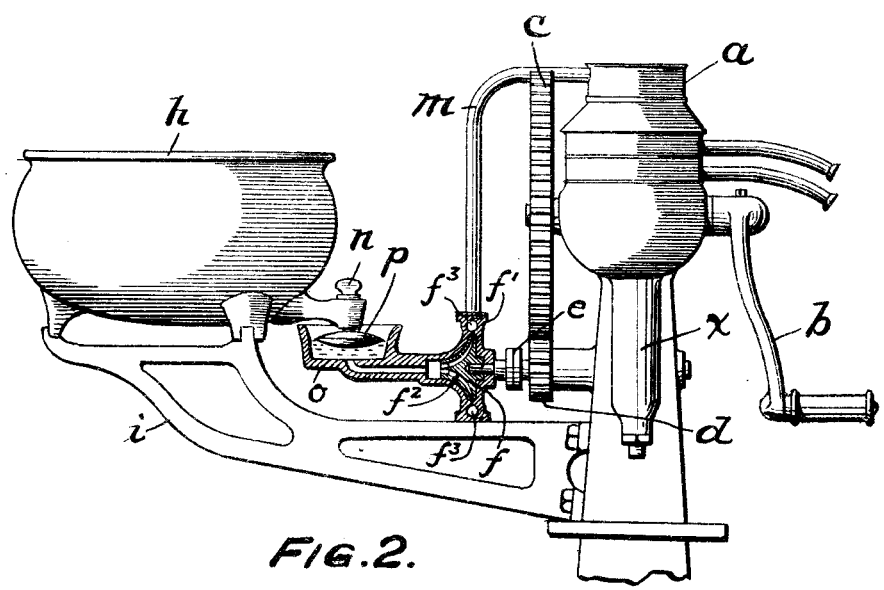

Figure 1 is a diagrammatic view of one embodiment of the invention and Fig. 2 is a diagrammatic view of an alternative construction.

It will be understood that the drawings are in part diagrammatic only and that the sizes are capable of computation from standard engineering data, although a specific example of relative sizes of the parts is hereinafter given.

Referring first to Fig. 1: $x$ is a cream separator with the feed cup $a$ with the usual regulating tube. The relative sizes of the feed cup and the tube are such that to cause full capacity of the machine to flow through the tube will require a milk level, in the cup, nearly up to its top. $b$ is the driving crank and on the shaft of this crank is a gear $c$ which drives a pinion $d$. On the pinion shaft (from which the bowl of the separator is driven) is an extension on which is secured one member of a coupling $e$, the other member of which is on a shaft $r$. The shaft $r$ turns in bearings carried by the casings $f$ and $g$ of two centrifugal pumps. The casing of the pump $f$ is shaped to receive an impeller $f'$, which is secured to the shaft $r$ so that it is driven at the same speed as the pinion shaft of the separator $x$. The impeller $f'$ is composed of two members connected by vanes $f^2$ affording passages for the flow of liquid from the center to the annular chamber $f^3$ within the periphery of the casing. The casing $g$ is provided with a similar impeller $g'$ on the shaft $r$. The two pumps $f$ and $g$ constitute centrifugal pumps of a known type. A characteristic feature of centrifugal pumps is that they cause a certain definite head for each speed of the impeller. This head is directly proportional to the square of the velocity of the tips of the blades. Therefore, with a certain definite difference in level between the supply tank and the discharge, there will be a certain definite minimum speed for discharge from the pump to begin. In my invention I take advantage of this characteristic feature of a centrifugal pump and, by combining it with other elements hereinafter described, attain the object of the invention.

$h$ is the supply can carried on a bracket $i$ attached to the separator frame. The pump $g$ is attached to, and has its inlet opening in communication with, the supply can $h$. The discharge pipe $j$ from the pump $g$ connects with a pan $k$ so arranged that milk entering the said pan may supply the pump $f$ through its inlet pipe $l$ and any excess can overflow into the supply can $h$. The discharge pipe $m$ from the pump $f$ connects to the feed cup $a$ of the separator. The pumps $g$ and $f$ and the supply can $h$ are meant to be connectible to form one unit easily placed on or removed from the bracket $i$ and so arranged that the same movements will cause the coupling $e$ to be engaged or released.

It is readily understood that, without departing from the spirit of my invention, other arrangements of parts may be made, such, for instance, as the combining in one casing of the two pumps $f$ and $g$ or of the two pipes $j$ and $l$.

The operation is as follows: After assembling the outfit the supply can $h$ is filled and the milk flows freely through the pump $g$ and rises in the pipe $j$ to the same level as in the supply can. When the machine is brought up toward its speed the pump $g$ will raise the milk into the pan $k$, from which the pump $f$ is supplied through the pipe $l$; and any excess can return to the supply can $h$. The pump $g$ thus maintains for the pump $f$ a supply level that is uniform in spite of variations in the level of the milk in the supply can. The pump $f$ is so proportioned that at the minimum speed for separation it will barely maintain, without discharge, a head equal to the difference in level between the pan $k$ and the feed cup $a$. As the speed of the machine, and, coincidently, that of the pump, increases the discharge of the pump will also increase, until at full speed of the machine the pump will feed all that the machine can properly separate. If the speed is increased above normal, the quantity of milk pumped will be greater than can flow out of the feed cup $a$ through its regulating tube; so the cup will be caused to overflow. The result of the above described operation is that if a machine be run at too low speed it will receive no feed, and the operator will naturally refrain from running at too high speed because of the overflow thus caused.

It may readily be understood that below a certain definite speed of the machine there will be no feed of milk and that as the speed increases above that speed there will be first a slow and then a faster feed as the speed increases till at normal speed the machine will be fed at normal capacity.

The following concrete example will serve to illustrate the adaptation of my invention to a known type of cream separator manufactured by the assignee of this invention. This separator has a capacity of 900 lbs. of milk per hour at 48 R. P. M. of the crank. The machine is capable of doing efficient separation, if the feed is right, at any speed from 40 R. P. M. to above 50 R. P. M. With the machine running at 48 R. P. M. of the crank the pinion shaft runs 626 R. P. M. At 40 R. P. M. of the crank the pinion shaft speed will be 522 R. P. M. The supply can may easily be placed so that the lift from the pan $k$ to the cup $a$ will be 9 inches. A centrifugal pump having an impeller 3.29" diameter running at 522 R. P. M. will raise milk to a height of about 9 inches without discharge. The same pump at 626 R. P. M. will raise milk about 13 inches without discharge or if the pump has to raise milk only 9 inches will have a head of 4 inches to overcome friction and cause velocity. If a nozzle about 13/32 inch diameter is put at a convenient location in the pipe from the pump to the feed cup $a$ the velocity head required for 900 lbs. per hour will be about 4 inches. It is thus seen that this outfit will supply no milk to the separator at less than 40 turns per minute of the crank, will supply 900 lbs. per hour at 48 turns, and intermediate amounts at intermediate speeds.

Referring to Fig. 2: the parts $x$, $a$, $b$, $c$, $d$, $e$, $f$, $h$, $i$ and $m$ are the same as in Fig. 1. For the pump $g$, pan $k$, pipes $j$ and $l$, and the open connection from supply can $h$ to pump $g$, is substituted the following construction: The supply can has a faucet $n$, $o$ is a feed cup for the pump $f$, $p$ is a float in the feed cup adapted to maintain an approximately uniform feed level for the pump. The operation, except for the maintenance of the feed level for the pump $f$ by a float instead of another pump, is the same as for the device shown in Fig. 1.

Though I have described my invention in connection with a cream separator the same devices may be used in connection with any apparatus where it is desired to increase the feed from zero at a predetermined low speed to a capacity varying with any speed in excess thereof.

Another useful purpose served by my invention is that of a speed indicator in that the operator, by observing the feed cup and noting the level therein, may determine whether the speed at which the machine is turning is within the desired range.

It may be stated that it is not novel to convey to the feed cup of a centrifugal separator the liquid to be separated by means of a pump geared to the separator bowl so that the two operate in unison, thereby causing the feed to vary with the speed. But this construction gives a low feed at a low speed. In other words it starts to feed before the machine reaches a separating speed. This result applicant seeks to avoid. It is also old broadly, to provide a constant level supply tank for feeding liquid to a centrifugal separator. Centrifugal pumps are also, of course, old and well-known. Applicant's invention resides, therefore, not in the broad combination of a pump and separator to effect the result of varying the feed of liquid with the speed of the separator; not in the employment of a centrifugal pump for the conveyance of the liquid; and not in the provision of a constant level supply for the tank; but in the novel combination of separator, centrifugal pump and means providing a constant suction feed for the pump regardless of the level of the source of supply, whereby there is provided a new combination of old elements, performing, in the new combination, the results, never before achieved, of causing the feed to begin only when the machine attains a predetermined minimum speed effective for proper separation and to then maintain a feed increasing with the speed regardless of the level of milk in the supply can.

Having now fully described my invention, what I claim and desire to protect by Letters Patent is:

1. The combination with a liquid treating device, of a source of liquid supply, a centrifugal pump comprising a casing having a central inlet and a peripheral discharge and a rotary impeller, means to drive the impeller in unison with the treating device, a connection affording a passage for the liquid from the supply to the pump inlet and means to maintain constant the suction head for the pump regardless of the level of the source of supply and a connection affording a passage for the liquid from the pump outlet to the treating device, the same arranged to provide a static discharge head of such height that the delivery of liquid will begin only on the attainment by the treating device of a specific speed.

2. The combination with a liquid treating device, of a source of liquid supply, a centrifugal pump and means to maintain a uniform suction head therefor interposed between said liquid supply and the pump and through which the liquid to be treated is adapted to pass, said pump comprising a casing having a central inlet and a peripheral outlet and a rotary impeller, whereby liquid will not be conveyed to the treating device until the speed of the pump exceeds a predetermined rate, and means to drive the impeller in unison with the treating device.

3. The combination with a liquid treating device, of a source of liquid supply, a connection affording a passage for the liquid to be treated from the supply to the treating device, a centrifugal pump interposed in said connection, said pump comprising a casing having a central inlet and a peripheral discharge and a rotary impeller, means to drive the impeller in unison with the treating device, and a constant level device interposed between the source of supply and the pump and adapted to maintain constant the difference in level between the feed for the pump and the discharge level to which the liquid must be raised to supply the treating device.

In testimony of which invention, I have hereunto set my hand, at Poughkeepsie, on this 5th day of January, 1916.

MEREDITH LEITCH.

Witnesses:
CHARLES L. POWELL,
E. LOUNSBERY DU BOIS.